United States Patent
Coe, Jr. et al.

(10) Patent No.: US 9,296,436 B2
(45) Date of Patent: Mar. 29, 2016

(54) MULTI-PURPOSE MACHINE CHASSIS

(71) Applicant: Caterpillar Global Mining America LLC, Houston, PA (US)

(72) Inventors: James W. Coe, Jr., Rocky Gap, VA (US); Tobi D. Crigger, Bland, VA (US)

(73) Assignee: Caterpillar Global Mining America LLC, Houston, PA (US)

( * ) Notice: Subject to any disclaimer, the term of this patent is extended or adjusted under 35 U.S.C. 154(b) by 125 days.

(21) Appl. No.: 14/012,791

(22) Filed: Aug. 28, 2013

(65) Prior Publication Data

US 2015/0060158 A1    Mar. 5, 2015

(51) Int. Cl.
*B62D 55/04* (2006.01)
*E21D 20/00* (2006.01)
*B62D 21/18* (2006.01)
*B62D 55/084* (2006.01)

(52) U.S. Cl.
CPC .............. *B62D 55/04* (2013.01); *B62D 21/186* (2013.01); *B62D 55/084* (2013.01); *E21D 20/003* (2013.01)

(58) Field of Classification Search
CPC ........................................................ B62D 55/04
USPC ............................................................. 180/9.1
See application file for complete search history.

(56) References Cited

U.S. PATENT DOCUMENTS

| | | | | |
|---|---|---|---|---|
| 2,800,188 A * | 7/1957 | Garrett | ............................. | 180/6.2 |
| 4,290,490 A * | 9/1981 | Barthe et al. | .................. | 173/189 |
| 4,420,277 A * | 12/1983 | Hibbard et al. | ............ | 405/259.5 |
| 4,434,864 A * | 3/1984 | Lupo | ............................... | 180/6.2 |
| 4,589,803 A * | 5/1986 | Totten, III | .................. | 405/302.1 |
| 4,966,242 A * | 10/1990 | Baillargeon | ................. | 180/9.44 |
| 5,240,084 A | 8/1993 | Christianson | | |
| 5,417,521 A * | 5/1995 | Scott | .......................... | 405/259.6 |
| 5,794,721 A * | 8/1998 | Clonch et al. | ................... | 175/45 |
| 6,431,301 B1 * | 8/2002 | Forbes | .......................... | 180/185 |
| 6,497,536 B1 * | 12/2002 | Neilson et al. | ................. | 405/288 |
| 6,602,026 B1 * | 8/2003 | Neilson | ....................... | 405/259.1 |
| 6,736,225 B2 * | 5/2004 | Pierce | ............................. | 175/58 |
| 6,886,645 B2 * | 5/2005 | Bise et al. | ....................... | 175/417 |
| 7,231,993 B2 * | 6/2007 | Albright et al. | ................ | 180/9.5 |
| 8,137,033 B1 * | 3/2012 | Hinshaw et al. | ........... | 405/302.3 |
| 8,157,039 B2 | 4/2012 | Melvin et al. | | |
| 8,317,430 B2 * | 11/2012 | Yan | ............................. | 405/259.1 |
| 8,342,267 B1 * | 1/2013 | Hinshaw et al. | ................ | 175/86 |
| 8,430,188 B2 * | 4/2013 | Hansen | ........................ | 180/9.26 |
| 8,794,358 B2 * | 8/2014 | Hansen | ........................ | 180/9.26 |
| 2006/0001250 A1 * | 1/2006 | Fukazawa et al. | ............ | 280/781 |

(Continued)

FOREIGN PATENT DOCUMENTS

WO   WO 2012/117204   9/2012
WO   WO 2012/141591   10/2012

*Primary Examiner* — Joseph Rocca
*Assistant Examiner* — Michael Stabley

(57) ABSTRACT

A chassis for a roof bolter includes a first plate positioned on a first side of the chassis and having a first mating surface, a second plate positioned opposite and substantially parallel to the first plate on a second side of the chassis and having a second mating surface substantially parallel to the first mating surface, and a plurality of openings positioned on the first plate and the second plate for receiving one or more fasteners, including wheel attachment openings for coupling the wheel assembly to at least one of the first plate or the second plate when the roof bolter is in a wheel configuration, and crawler attachment openings for coupling the crawler assembly to at least one of the first plate or the second plate when the roof bolter is in a crawler configuration.

15 Claims, 10 Drawing Sheets

(56) References Cited

U.S. PATENT DOCUMENTS

| | | | |
|---|---|---|---|
| 2010/0060075 A1* | 3/2010 | Hansen | 305/15 |
| 2010/0119310 A1* | 5/2010 | Yan | 405/259.1 |
| 2010/0221071 A1* | 9/2010 | Hinshaw et al. | 405/259.1 |
| 2012/0247836 A1* | 10/2012 | Wilson et al. | 175/57 |
| 2013/0149094 A1* | 6/2013 | Nakanishi et al. | 414/687 |

* cited by examiner

MULTI-PURPOSE MACHINE CHASSIS

TECHNICAL FIELD

This disclosure relates to mining equipment such as roof bolters, and more particularly to a multi-purpose chassis for supporting multiple drive configurations for a roof bolter.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Industrial vehicles, such as roof bolters and other mining vehicles, are often operated in extreme and diverse conditions and thus may be required to travel over a variety of surfaces in order to perform various functions of the vehicle. For instance, the same vehicle may be required to travel over gravel, mud, pavement and/or other various surfaces to travel between job sites or during the course of a job or task. However, some vehicles, or some vehicle drives (e.g., crawler drive, wheel drive, etc.), may not be best suited for a particular surface, resulting in sub-optimal performance when operating over that surface. As a result, the vehicle drive may need to be changed out or replaced with a drive better suited to the surface, or the particular job or task, in order for the vehicle to operate most efficiently. Often, the vehicle chassis is configured to receive a specific vehicle drive, such that the chassis must also be changed out or replaced in order to change out the vehicle drive, which can result in significant downtime for the vehicle.

Some vehicles may include a modular chassis having a common frame for supporting different types of vehicles. An example of such a vehicle and modular chassis can be found in PCT Patent Application No. PCT/FR2012/050426, published Sep. 7, 2012, for "Flat Modular Chassis, and Vehicle Provided with such a Chassis," which discloses a vehicle having a common frame and "other sets of body adaptable to said frame and to perform alternately on the same frame by selecting the appropriate set." However, the disclosed modular chassis is configured to receive a wheel drive, such that the modular chassis must be changed out or replaced in order to install another type of drive more suitable for a particular terrain, resulting in significant downtime for the vehicle.

SUMMARY

An embodiment of the present disclosure relates to a chassis for a roof bolter having a wheel configuration and a crawler configuration. The chassis includes a first plate positioned on a first side of the chassis and having a first mating surface, a second plate positioned opposite and substantially parallel to the first plate on a second side of the chassis and having a second mating surface substantially parallel to the first mating surface, and a plurality of openings positioned on the first plate and the second plate for receiving one or more fasteners. The plurality of openings includes wheel attachment openings patterned to match at least one opening of a wheel assembly for coupling the wheel assembly to at least one of the first plate or the second plate when the roof bolter is in the wheel configuration, and crawler attachment openings patterned to match at least one opening of a crawler assembly for coupling the crawler assembly to at least one of the first plate or the second plate when the roof bolter is in the crawler configuration.

Another embodiment of the present disclosure relates to a roof bolter having a wheel configuration and a crawler configuration. The roof bolter includes a body comprising a bolting component, and a chassis coupled to the body. The chassis includes a first plate positioned on a first side of the chassis and having a first mating surface, a second plate positioned opposite and substantially parallel to the first plate on a second side of the chassis and having a second mating surface substantially parallel to the first mating surface, and a plurality of openings positioned on the first plate and the second plate for receiving one or more fasteners. The plurality of openings includes wheel attachment openings for coupling the wheel assembly to the chassis and crawler attachment openings for coupling the crawler assembly to the chassis.

Another embodiment of the present disclosure relates to a chassis for a roof bolter having a wheel configuration and a crawler configuration. The chassis includes a first plate positioned on a first side of the chassis and having a first mating surface for mating with at least one of a first crawler assembly and a first wheel assembly, a second plate positioned substantially parallel to and opposite the first plate on a second side of the chassis and having a second mating surface positioned substantially parallel to the first mating surface for mating with at least one of a second crawler assembly and a second wheel assembly. The second plate substantially mirrors the first plate in this embodiment. The chassis also includes a plurality of openings positioned on the first plate and the second plate for receiving one or more fasteners. The plurality of openings includes wheel attachment openings for coupling the first wheel assembly to the first plate and the second wheel assembly to the second plate when the roof bolter is in the wheel configuration, and crawler attachment openings for coupling the first crawler assembly to the first plate and the second crawler assembly to the second plate when the roof bolter is in the crawler configuration. The wheel attachment openings are patterned to substantially match one or more openings of each of the first wheel assembly and the second wheel assembly and the crawler attachment openings are patterned to substantially match one or more openings of each of the first crawler assembly and the second crawler assembly.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
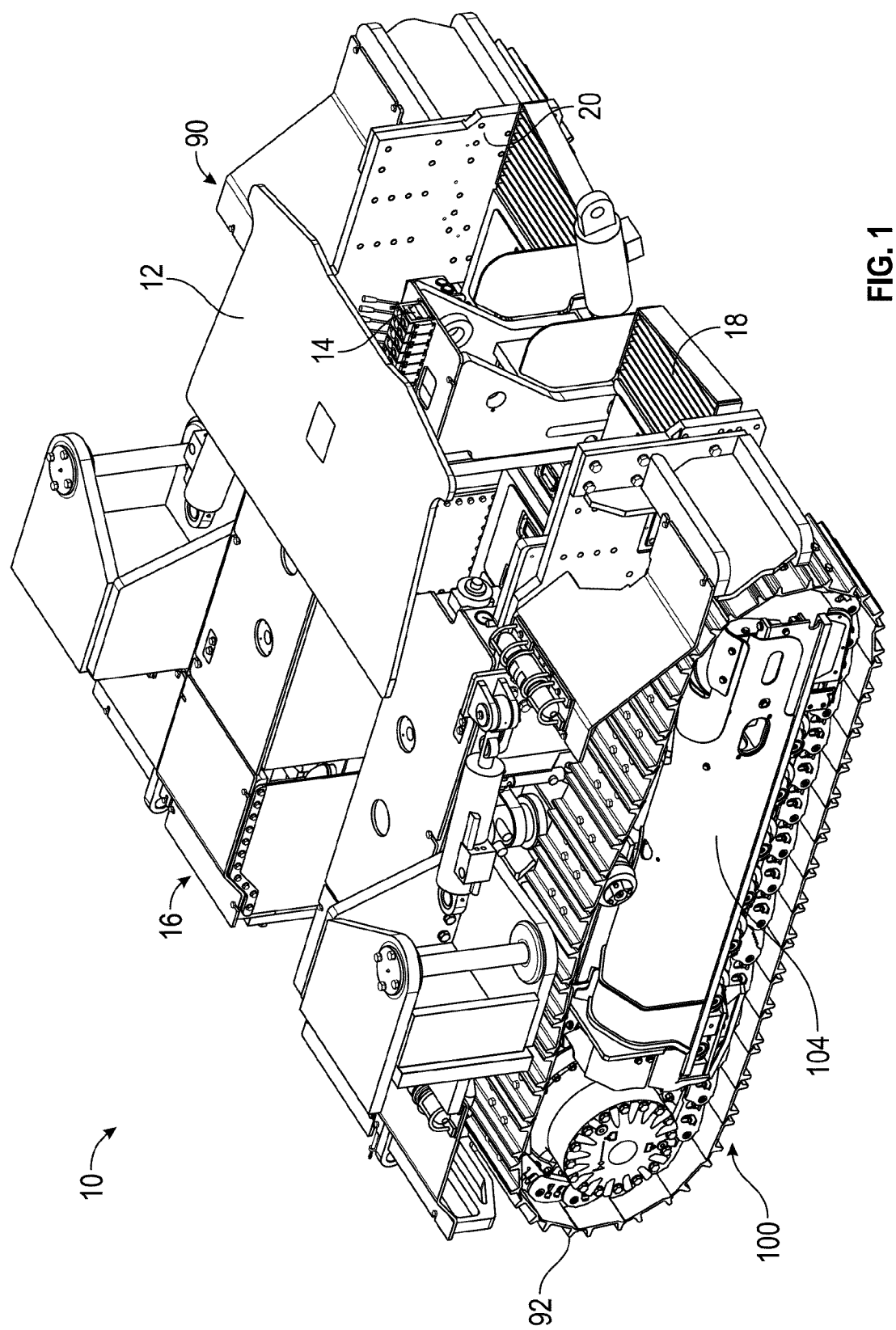
FIG. 1 is a perspective view of a roof bolter in a crawler configuration, according to an exemplary embodiment.
Figure 2:
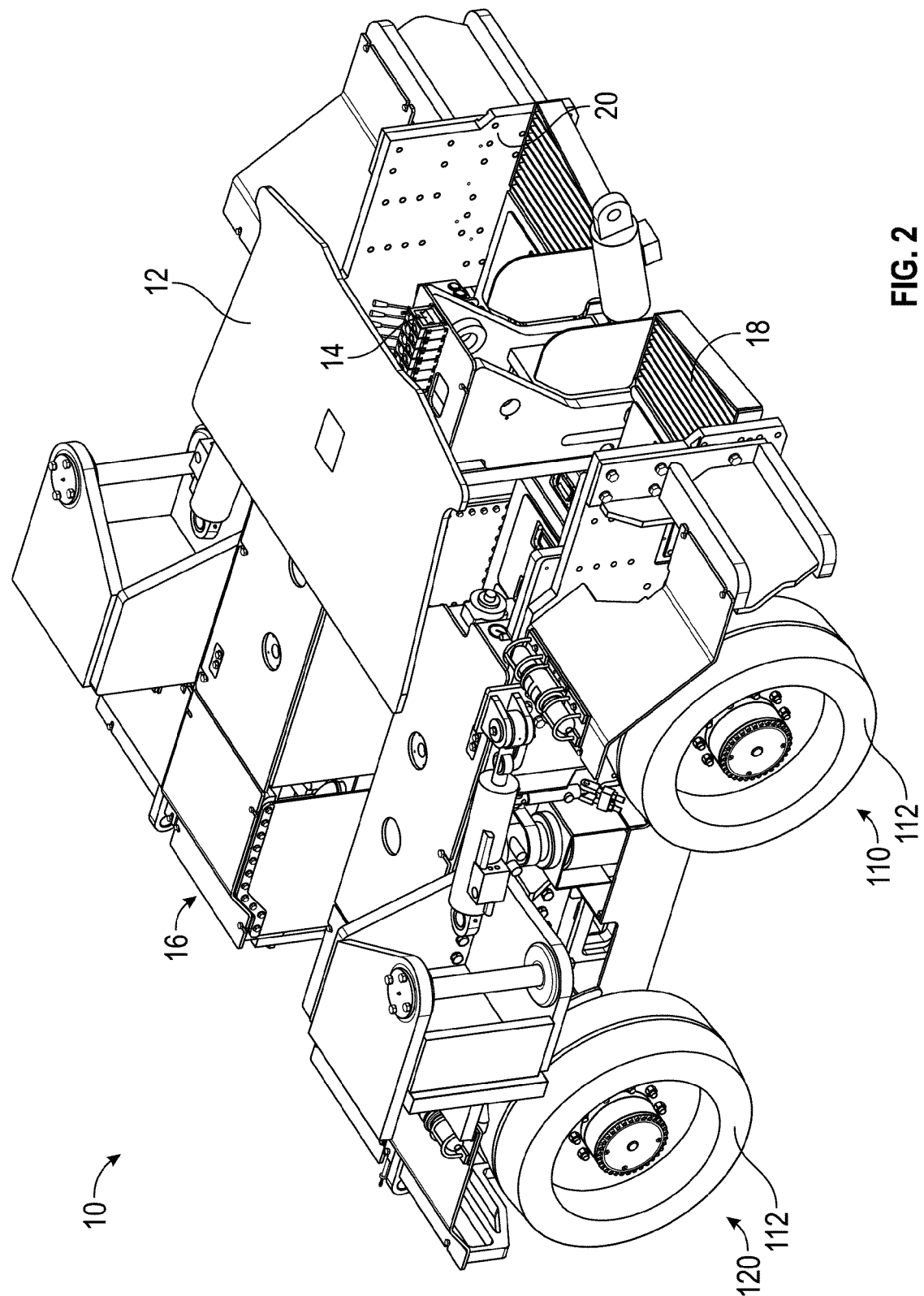
FIG. 2 is a perspective view of the roof bolter in a wheel configuration, according to an exemplary embodiment.

Referring to FIGS. 1 and 2, a roof bolter 10 is shown in multiple configurations, according to an exemplary embodiment. The roof bolter 10 may be used to secure the roof of an underground mine or other space in order to prevent the roof of the mine from collapsing. In an underground mining application, the roof bolter 10 is used to drill rock bolts (not shown) into the roof of the mine so that the roof is self-supportive and maintains its integrity. In the illustrated embodiment of FIGS. 1 and 2, the roof bolter 10 includes a body 16 for housing most of the functional components of the roof bolter 10. In this embodiment, for instance, the body 16 includes a platform 18 for an operator of the roof bolter 10 to stand, operator controls 14 for controlling one or more movements of the roof bolter 10, and a plate 12 for protecting the body 16 of the roof bolter 10 from debris. The roof bolter 10 also includes a chassis 20 (i.e., multi-purpose chassis, multi-purpose machine chassis, frame, etc.) coupled to the body 16 such that the body 16 mounted onto the chassis 20 in the illustrated embodiment. In this embodiment, the chassis 20 provides a framework for the roof bolter 10, supporting the roof bolter 10 in its construction and use. The chassis 20 is described in further detail below in references to FIGS. 3-5.

In an exemplary embodiment, the roof bolter 10 is changeable (i.e., adaptable, configurable) between a crawler configuration (shown in FIG. 1) and a wheel (i.e., wheeled) configuration (shown in FIG. 2), depending on which configuration is more suitable for the particular terrain or the particular application of the roof bolter 10. In each configuration, the body 16 and the chassis 20 of the roof bolter 10 remain substantially the same, but the drive assemblies (e.g., crawler assembly 90 or 100, wheel assembly 110 or 120) are removed and replaced (i.e., changed out) according to the desired configuration. For instance, the crawler configuration of the roof bolter 10 may be particularly useful for moving the roof bolter 10 along an uneven surface, such as gravel or rock, while the wheel configuration may be particularly useful for moving the roof bolter 10 more efficiently along a more even surface, or along a surface in which the body 16 of the roof bolter 10 must be held a distance above the surface.

In the crawler configuration of FIG. 1, the roof bolter 10 includes a crawler assembly 90 (shown in further detail in FIGS. 9-12) and a crawler assembly 100 (shown in further detail in FIGS. 13 and 14) which are both coupled to the chassis 20 (and thus the body 16) for moving the roof bolter 10 along a terrain or surface. In an exemplary embodiment, the crawler assemblies 90 and 100 are removably coupled to the chassis 20 such that the crawler assemblies 90 and 100 may be removed from the roof bolter 10 without removing the chassis 20 from the roof bolter 10. In the illustrated embodiment of FIG. 1, the crawler assembly 100 is a right hand drive assembly and the crawler assembly 90 is a left hand drive assembly, each installed on the applicable or corresponding side of the roof bolter 10 in FIG. 1. In this embodiment, the crawler assemblies 90 and 100 are substantially mirror images of each other and are similarly constructed to fit on opposite sides of the body 16 to drive or advance the roof bolter 10. In an exemplary embodiment, the crawler assemblies 90 and 100 may be coupled to the chassis 20 by a plurality of bolts or other fasteners, but in other embodiments the crawler assemblies 90 and 100 may be coupled to the chassis 20 in another manner suitable for the particular application of the roof bolter 10.

The crawler assemblies 90 and 100 each include tracks 92 that rotate around a crawler frame (e.g., frame 94, frame 104, etc.) to move the roof bolter 10 along the terrain or surface. The tracks 92 of the crawler assemblies 90 and 100 may rotate substantially in unison to move the roof bolter 10 in a substantially straight forward or backward direction, depending on the direction of rotation of the tracks 92. To turn the roof bolter 10 while in the crawler configuration, the tracks 92 of the crawler assembly 90 or 100 may rotate while the tracks 92 of the other crawler assembly 90 or 100 remain substantially stationary. In an exemplary embodiment, the tracks 92 include a continuous belt of metal plates configured to grip a floor surface and push the roof bolter 10 forward or backward, depending on the direction of rotation of the tracks 92. In other embodiments, the tracks 92 may be made from or include a series of plates made from rubber or other suitable material(s), the tracks 92 may be made from a single piece of material, or the tracks may have another configuration or be made from other material(s) suitable for the particular application of the roof bolter 10. The crawler assemblies 90 and 100 are described in further detail below in reference to FIGS. 9-12 and 13-14, respectively.

In the wheel configuration (see FIG. 2), the roof bolter 10 includes a wheel assembly 110 and a wheel assembly 130 (i.e., wheel drive assemblies or wheel installations) coupled to the chassis 20 (and thus the body 16) for moving the roof bolter 10 along a terrain or surface (e.g., a floor surface of an underground mine). In an exemplary embodiment, the wheel assemblies 110 and 130 are removably coupled to the chassis 20 such that the wheel assemblies 110 and 130 may be removed from the roof bolter 10 without removing the chassis 20 from the roof bolter 10. Each wheel assembly 110 or 130 includes a wheel 112 for contacting the surface as the roof bolter 10 moves along the surface. In the illustrated embodiment of FIG. 2, the roof bolter 10 includes two wheel assemblies 110 coupled to the chassis 20 at the front of the roof bolter 10 and coupled to each other by a front wheel axle (not shown). The roof bolter 10 also includes two wheel assemblies 130 coupled to the chassis 20 at the rear of the roof bolter 10 and coupled to each other by a rear wheel axle (not shown). In this embodiment, the wheel assemblies 110 and 130 are each individually coupled to the chassis 20. In another embodiment, a wheel assembly 110 and a wheel assembly 130 may be coupled as part of a larger wheel assembly and the larger wheel assembly may be removably coupled to the chassis 20. For instance, in one embodiment the wheel assembly 110 and the wheel assembly 130 positioned on the right hand side of the roof bolter 10 may be grouped as a right hand wheel drive assembly, and the wheel assembly 110 and the wheel assembly 130 positioned on the left hand side of the roof bolter 10 may be grouped as a left hand wheel drive assembly. In this embodiment, the right hand and left hand wheel drive assemblies may be removably coupled to the chassis 20 as two distinct components (rather than four distinct components as shown in FIG. 2). In other embodiments, the roof bolter 10 may include four identical wheel assemblies removably coupled to the chassis 20 in the wheel configuration. In other embodiments, the roof bolter 10 may include more or less than four wheel assemblies (e.g., wheel assemblies 110 or 130) and four wheels 112 to move the roof bolter 10 along a surface in the wheel configuration. In still other embodiments, the roof bolter 10 may include another amount, type, or configuration of wheel assemblies removably coupled to the roof bolter in the wheel configuration, as may be suitable for the particular application of the roof bolter 10. In an exemplary embodiment, the wheel assemblies 110 and 130 are coupled to the chassis 20 by a plurality of bolts or other fasteners, but in other embodiments the wheel assemblies 110 and 130 may be coupled to the chassis 20 in another manner suitable for the particular application of the roof bolter 10. The wheel assemblies 110 and 130 are described in further detail below in reference to FIGS. 15 and 16, respectively.

Figure 3:
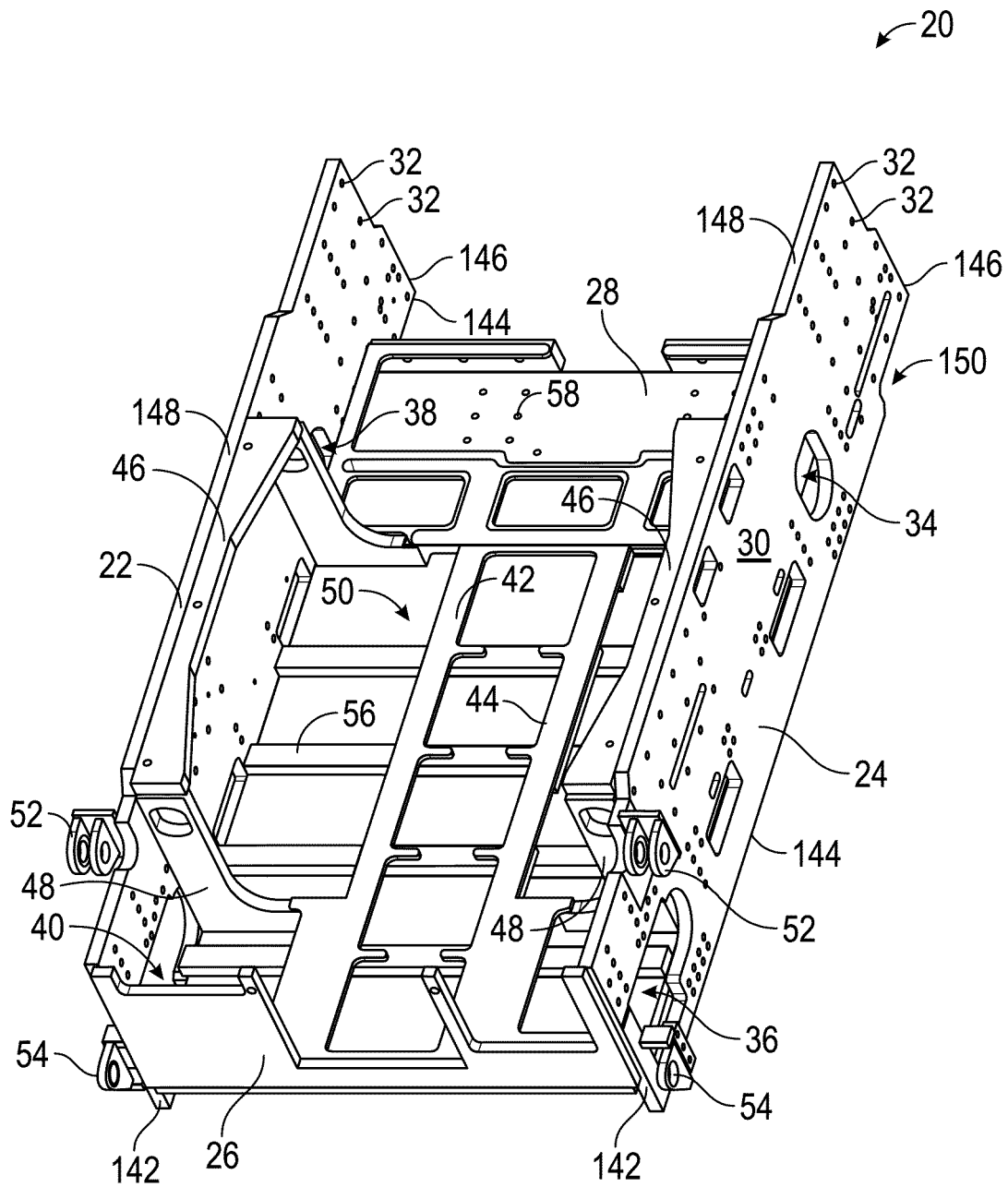
FIG. 3 is a perspective view of a multi-purpose chassis for the roof bolter, according to an exemplary embodiment.
Figure 4:
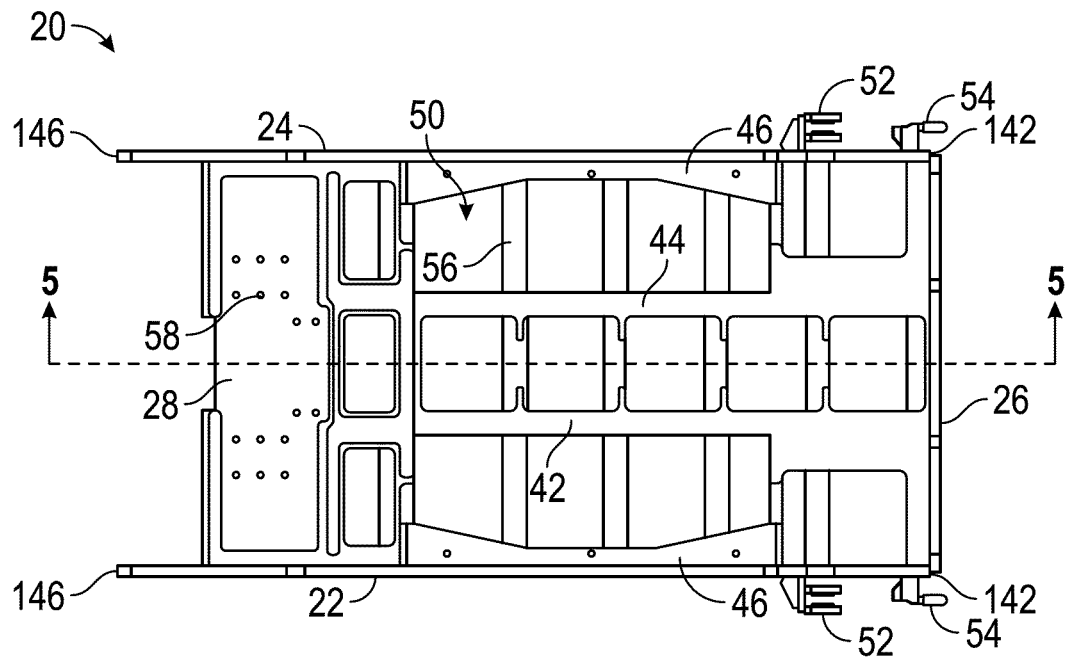
FIG. 4 is a top plan view of the multi-purpose chassis of FIG. 3.
Figure 5:
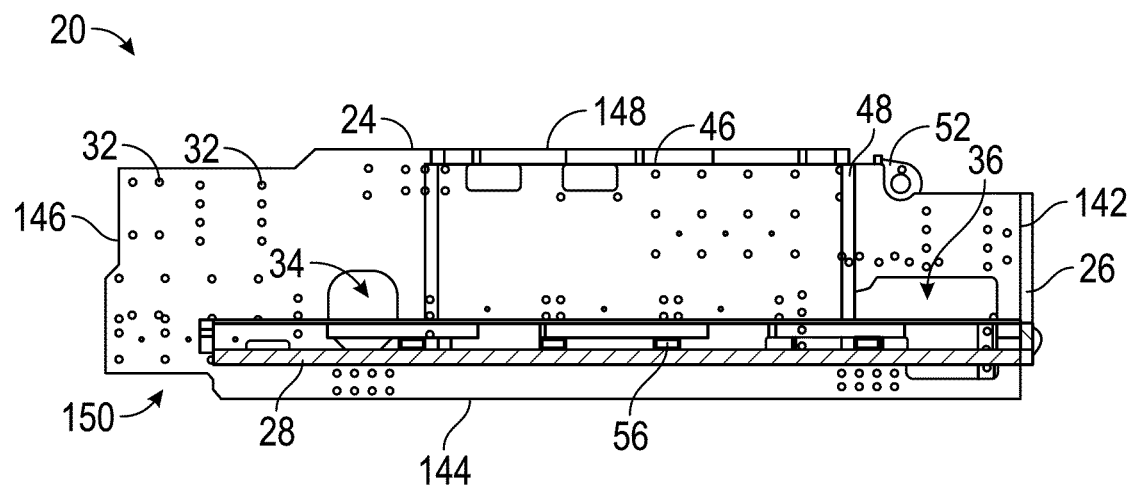
FIG. 5 is a cross-sectional view of the multi-purpose chassis of FIG. 3, taken along line 5-5 in FIG. 4.

Referring now to FIGS. 3-5, a chassis 20 for the roof bolter 10 is shown, according to an exemplary embodiment. In this embodiment, the chassis 20 is adaptable for the crawler configuration and the wheel configuration, being configured to couple the wheel assemblies 110 and 130 or the crawler assemblies 90 and 100 to the roof bolter 10, depending on which configuration of the roof bolter 10 is necessary or desirable for the particular application of the roof bolter 10. The chassis 20 is configured to receive a drive assembly (e.g., crawler assembly 90 or 100, wheel assembly 110 or 120, etc.) of the roof bolter 10 in order to mobilize the roof bolter 10 for a particular use. The drive assembly may be removed from the roof bolter 10 and replaced with another drive assembly without removing or replacing the chassis 20.

In the illustrated embodiment of FIGS. 3-5, the chassis 20 includes a first mating plate 22 positioned on a first side of the chassis 20 and a second mating plate 24 positioned on an opposite second side of the chassis 20. The mating plates 22 and 24 are positioned substantially parallel to each other. In the illustrated embodiment of FIGS. 3-5, the mating plates 22 and 24 extend substantially the length of the chassis 20 to form boundaries on a left and a right side of the chassis 20 (according to FIG. 3), respectively. The mating plates 24 and 22 are adaptable to receive the wheel assemblies 110 and 130 and the crawler assemblies 90 and 100.

The chassis 20 also includes a base plate 28 positioned on the bottom of the chassis 20 (according to FIG. 3). The base plate 28 may be a single piece covering the bottom of the chassis 20, or the base plate 28 may be made from more than one component or an assembly of one or more components. In one embodiment, the base plate 28 includes one or more openings or holes for service or other use. For instance, in the illustrated embodiment the base plate 28 includes openings 58 for receiving fasteners to couple the chassis 20 to one or more components, including one or more components of the roof bolter 10. The base plate 28 is positioned between and substantially perpendicular to the mating plates 22 and 24 in the illustrated embodiment of FIGS. 3-5. In this embodiment, the chassis 20 also includes a back plate 26 positioned between and substantially perpendicular to the mating plates 22 and 24. The back plate 26 extends from the first mating plate 22 to the second mating plate 24, forming another boundary of the chassis 20. The back plate 26 is also substantially perpendicular to the base plate 28, extending vertically from the bottom of the chassis 20 according to the orientation as installed within the roof bolter 10 (shown in FIGS. 1 and 2). In an exemplary embodiment, the back plate 26 and the base plate 28 are coupled to the mating plates 22 and 24, and may connect or otherwise couple the mating plate 22 to the mating plate 24. In the illustrated embodiment, the back plate 26 includes a first opening The chassis 20 also includes an open and boundary-less side opposite the back plate 26.

In an exemplary embodiment, the mating plate 22 substantially mirrors the mating plate 24, such that the proceeding description of the mating plate 24 applies similarly to the mating plate 22. In the illustrated embodiment of FIGS. 3-5, the mating plate 24 is substantially rectangular, having a first side 142 connected to the back plate 26, a second side 144 positioned adjacent and substantially perpendicular to the first side 142 and connected to the base plate 28, a third side 146 opposite and substantially parallel to the first side 142 and positioned at the open end of the chassis 20, and a fourth side 148 positioned substantially parallel to the second side 144 and substantially perpendicular to the first side 142. The first side 142 is substantially flat and configured to rest flat against the back plate 26. The second side 144 is also substantially flat except for a recessed portion 150 at the front end of the chassis 20 (according to the orientation within the roof bolter 10) and near the open end of the chassis 20. The recessed portion 150 may be used to receive another or couple with another component of the roof bolter 10. The third side 146 includes a raised portion at the bottom of the third side 146 and adjacent to the recessed portion 150 of the second side 144. The fourth side 148 includes a raised section at the approximate center of the fourth side 148.

The mating plate 24 includes a mating surface 30 for mating with a drive assembly (e.g., crawler assembly 100, wheel assembly 110 or 120, etc.). The mating surface 30 is substantially flat and faces outward from the chassis 20 and the roof bolter 10 (as installed) to receive the required drive assembly when the chassis 20 is installed to the roof bolter 10 (as shown in FIGS. 1 and 2). The mating surface 30 may extend substantially the length of the mating plate 24 (as shown in FIGS. 3-5), or the mating surface 30 may be portioned or sectioned such that the mating surface 30 includes a minimum amount of material to receive the required drive assembly. In an exemplary embodiment, one or more of the drive assemblies (e.g., crawler assembly 90 or 100, wheel assembly 110 or 120) include a similar flat mating surface (e.g., mating surfaces 98, 102, 118, 138, etc.) that abuts with the flat mating surface 30, such that the surfaces (e.g., mating surface 30 and a surface of the drive assembly) rest substantially flat against each other when the drive assembly is coupled to the chassis 20. In the illustrated embodiment, the mating plate 22 includes a mating surface substantially similar to the mating surface 30, including being similarly sized and shaped. In these embodiments, the above description of the mating surface 30 applies similarly to the mating surface of the mating plate 22. However, in other embodiments the mating plates 22 and 24 may be otherwise sized and shaped, including having different sizes, shapes and/or configurations, as may be suitable for the particular application of the roof bolter 10. In these embodiments, the mating surface 30 and the mating surface of the mating plate 22 may be differently sized and shaped for another purpose suitable for the particular application of the chassis 20 and/or the roof bolter 10. For instance, the crawler assemblies 90 and 100 or the wheel assemblies 110 and 130 may be substantially different in other embodiments, such that the mating plates 22 and 24 of the chassis 20 are required to have different sizes and/or shapes in order to accommodate the differently sized and/or shaped crawler assemblies 90 and 100.

In an exemplary embodiment, the chassis 20 includes a plurality of openings 32 formed on or within the mating plates 22 and 24 for receiving bolts or other fasteners (e.g., fasteners 114) in order to couple the preferred or required drive assembly to the chassis 20. Some openings 32 (i.e., a first set of openings, a first pattern of openings, wheel attachment openings) are patterned or otherwise configured to match or approximate a pattern or configuration of openings included on the wheel assemblies 110 and 130 (e.g., openings 120 and 134 shown in FIGS. 15 and 16). The wheel attachment openings are configured to line up with or match openings 120 and 134, such that the wheel assemblies 110 and 130 may be coupled to the chassis 20 by routing a sufficient number of fasteners through the wheel attachment openings and the openings 120 and 134. The wheel attachment openings may include more openings 32 than is necessary to couple the wheel assemblies 110 and 130 to the chassis 20 in order to allow the wheel assemblies 110 and 130 to be coupled at multiple heights, such as to provide a greater height for additional wheel clearance in a particular environment. The wheel attachment openings may have a distinct pattern to match a distinct pattern of the openings 120 and 134, or the wheel attachment openings may be configured to accommodate other wheel assemblies in addition to wheel assemblies 110 and 130.

Further, some of the openings 32 (i.e., a second set of openings, a second pattern of openings, crawler attachment openings) are patterned or otherwise configured to match or approximate a pattern or configuration of openings (not shown) included on the crawler assemblies 90 and/or 100. The crawler attachment openings are configured to line up or match the openings of the crawler assemblies 90 and/or 100, such that the crawler assemblies 90 and 100 may be coupled to the chassis 20 by routing a sufficient number of fasteners through the crawler attachment openings and the openings of the crawler assemblies 90 and 100. In an exemplary embodiment, the wheel attachment openings are distinct and separate from the crawler attachment openings. In another embodiment, at least one of the openings 32 included in the wheel attachment openings are also included in the crawler attachment openings, such that a lesser number of openings 32 is required within the mating plates 22 and 24 in order to accommodate both configurations of the roof bolter 10.

In the illustrated embodiment of FIGS. 3-5, the mating plate 24 includes axle openings 34 and 36 and the mating plate 22 includes axle openings 38 and 40 for receiving wheel axles (not shown) when the roof bolter 10 is in the wheel configuration. The axle openings 34 and 38 are sized, shaped, or otherwise configured to receive a front wheel axle (i.e., front axle) of the roof bolter 10 and the axle openings 34 and 40 are sized, shaped, or otherwise configured to receive a rear wheel axle (i.e., rear axle) of the roof bolter 10. In an exemplary embodiment, the mating plate 22 is substantially a mirror image of the mating plate 24, such that axle openings 34 and 38 are similarly sized and shaped and axle openings 36 and 40 are similarly sized and shaped. In this embodiment, the axle openings 34 and 38 are similarly positioned on the mating plates 24 and 22, respectively, such that a front wheel axle may be routed through the axle opening 34 (e.g., a first front axle opening) and the axle opening 38 (e.g., a second front axle opening), extending from the mating plate 24 to the mating plate 22 in order to couple a first front wheel assembly and a second front wheel assembly (e.g., wheel assemblies 110). Further in this embodiment, the axle openings 36 and 40 are similarly positioned on the mating plates 24 and 22, respectively, such that a rear wheel axle may be routed through the axle opening 36 (e.g., a first rear axle opening) and the axle opening 40 (e.g., a second rear axle opening), extending from the mating plate 24 to the mating plate 22 in order to couple a first rear wheel assembly and a second rear wheel assembly (e.g., wheel assemblies 130).

In an exemplary embodiment, such as the illustrated embodiment of FIG. 2, wheel assemblies 110 (i.e., front wheel assemblies) are installed or mounted on the mating plates 24 and 22 of the chassis 20, covering the axle openings 34 and 38, respectively. In this embodiment, a first wheel assembly 110 (i.e., a front right hand wheel assembly) is coupled to the mating plate 24 at or near the axle opening 34. In this embodiment, at least some of the wheel attachment openings are positioned at or near the axle opening 34 and configured to line up with or match the openings 120 of the first wheel assembly 110. To couple the first wheel assembly 110 to the chassis 20 at the axle opening 34, fasteners are routed through the openings 120 of the first wheel assembly 110 and the corresponding wheel attachment openings positioned at or near the axle opening 34 of the mating plate 24. In this embodiment, a first end of a first wheel axle (i.e., a front wheel axle) (not shown) is coupled to the first wheel assembly 110 and the first wheel axle is positioned within or routed through the axle opening 34. The first wheel axle extends from the mating plate 24 to the mating plate 22, extending through or positioned within the corresponding axle opening 38 within the mating plate 22. A second wheel assembly 110 (i.e., front left hand wheel assembly) is coupled to the mating plate 22 and coupled to a second end of the first wheel axle, such that the first wheel assembly 110 and the second wheel assembly 110 are coupled to opposite ends of the first wheel axle and wheels 112 of the first and second wheel assemblies 110 are configured to rotate along with the first wheel axle. In the illustrated embodiment of FIGS. 3-5, at least some of the wheel attachment openings are positioned substantially around the axle opening 38 of the mating plate 22 (e.g., positioned similarly to the wheel attachment openings around the axle opening 34) and configured to line up with openings 120 of the second wheel assembly 110. To couple the second wheel assembly 110 to the chassis 20 at the axle opening 38, fasteners are routed through the openings 120 of the second wheel assembly 110 and the corresponding wheel attachment openings positioned at or near the axle opening 38 of the mating plate 22.

Similarly, wheel assemblies 130 (i.e., rear wheel assemblies) may be installed or mounted on the mating plates 24 and 22 of the chassis 20, covering the axle openings 36 and 40, respectively. In an exemplary embodiment, such as the illustrated embodiment of FIG. 2, a first wheel assembly 130 (i.e., a rear right hand wheel assembly) is coupled to the mating plate 24 at or near the axle opening 36. In this embodiment, at least some of the wheel attachment openings are positioned at or near the axle opening 36 and configured to line up with or match the openings 134 of the wheel assembly 130. To couple the first wheel assembly 130 to the chassis 20 at the axle opening 36, fasteners are routed through the openings 134 of the first wheel assembly 130 and the corresponding wheel attachment openings positioned at or near the axle opening 36 of the mating plate 24. In this embodiment, a first end of a second wheel axle (i.e., a rear wheel axle) (not shown) is coupled to the first wheel assembly 130 and the second wheel axle is positioned within or routed through the axle opening 36. The second wheel axle extends from the mating plate 24 to the mating plate 22, extending through or positioned within the corresponding axle opening 40 within the mating plate 22. A second wheel assembly 130 (i.e., rear left hand wheel assembly) is coupled to the mating plate 22 and coupled to a second end of the second wheel axle, such that the first wheel assembly 130 and the second wheel assembly 130 are coupled to opposite ends of the second wheel axle and wheels 112 of the first and second wheel assemblies 130 are configured to rotate along with the second wheel axle. In the illustrated embodiment of FIGS. 3-5, at least some of the wheel attachment openings are positioned substantially around the axle opening 40 of the mating plate 22 (e.g., positioned similarly to the wheel attachment openings around the axle opening 36) and configured to line up with openings 134 of the second wheel assembly 130. To couple the second wheel assembly 130 to the chassis 20 at the axle opening 40, fasteners are routed through the openings 134 of the second wheel assembly 130 and the corresponding wheel attachment openings positioned at or near the axle opening 40 of the mating plate 22.

In an exemplary embodiment, such as the illustrated embodiment of FIG. 1, crawler assemblies 100 and 90 are coupled to mating plates 24 and 22, respectively, when the roof bolter 10 is in the crawler configuration. In this embodiment, the crawler assembly 100 includes a mating surface 102 for mating with the mating plate 24. When the crawler assembly 100 is coupled to the chassis 20, the mating surface 102 abuts with the substantially flat mating surface 30 of the mating plate 24, and is positioned adjacent to and substantially parallel with the mating surface 30. In an exemplary embodiment, the mating surface 102 contacts the mating surface 30 at more than one point on the respective mating surfaces 102 and 30 when the crawler assembly 100 is coupled to the chassis 20. The crawler assembly 100 includes a pattern of openings or holes formed on or within the mating surface 102 (not shown, but similar in size and shape to openings 88 shown in FIG. 11) for receiving fasteners to couple the crawler assembly 100 to the chassis 20. In an exemplary embodiment, the openings of the mating surface 102 are patterned or otherwise configured such that the openings of the mating surface 102 line up or match one or more of the crawler attachment openings located on or within the mating plate 24. In this embodiment, fasteners are routed through the openings of the mating surface 102 and one or more of the crawler attachment openings to mate or couple the crawler assembly 100 to the chassis 20. In an exemplary embodiment, the mating surface 102 is sized and shaped to mate with the mating plate 24, such that the crawler assembly 100 may be removably coupled to the mating plate 24.

Similarly, the crawler assembly 90 includes a mating surface 98 (shown in FIGS. 10-12) for mating with the mating plate 22. When the crawler assembly 90 is coupled to the chassis 20, the mating surface 98 abuts with the substantially flat mating surface of the mating plate 22, and is positioned adjacent to and substantially parallel with the mating surface of the mating plate 22. In an exemplary embodiment, the mating surface 98 contacts the mating surface of the mating plate 22 at more than one point when the crawler assembly 90 is coupled to the chassis 20. The crawler assembly 90 includes a pattern of openings 88 (i.e., holes) formed on or within the mating surface 98 that are similar in size and shape to the openings 32. The openings 88 are intended to receive fasteners to couple the crawler assembly 90 to the chassis 20. In an exemplary embodiment, the openings 88 are patterned or otherwise configured such that the openings 88 line up with or match one or more of the crawler attachment openings located on or within the mating plate 22. In this embodiment, fasteners are routed through the openings 88 and one or more of the crawler attachment openings to mate or couple the crawler assembly 90 to the chassis 20. In an exemplary embodiment, the mating surface 98 is sized and shaped to mate with the mating plate 22, such that the crawler assembly 90 may be removably coupled to the mating plate 22.

In the illustrated embodiment of FIGS. 3-5, the chassis 20 includes bars 42 and 44 (i.e., rails, ribs, etc.) positioned at a bottom portion of the chassis 20 (according to the orientation when installed within the roof bolter 10, as shown in FIGS. 1 and 2). In this embodiment, the bars 42 and 44 extend from the back plate 26 to a distance past the midway point between the back plate 26 and the front end of the chassis 20 (again according to the orientation shown in FIGS. 1 and 2). The bars 42 and 44 are substantially mirror images of each other, having a section with a first thickness near the back plate 26 and a second section with a second thickness as the bars 42 and 44 extend toward the front opening of the chassis 20. The first section of each of the bars 42 and 44 is substantially flat and wider than the second section of each of the bars 42 and 44. The chassis 20 also includes bars 56 positioned below the bars 42 and 44 within the chassis 20 and positioned substantially perpendicular to the bars 42 and 44. In the illustrated embodiment, the chassis 20 includes six bars 56 positioned substantially equal distances apart, with the first bar 56 positioned adjacent to the back plate 26 and the sixth bar 56 positioned near the axle openings 34 and 36. In an exemplary embodiment, the bars 56 provide a frame or structure for the chassis 20, connecting and coupling the mating plate 24 to the mating plate 22. The bars 56 cross the bars 42 and 44 perpendicularly to form openings 50 in the bottom of the chassis 20. The openings 50 may be used to service one or more components within the chassis 20, or for another purpose suitable for the particular application of the chassis 20. The bars 42 and 44 include projections spaced substantially equally along the length of the bars 42 and 44 and positioned at or near the four center bars 56. The projections of each of the bars 42 and 44 extend toward each other and toward the opposite bar 42 or 44, covering a portion of the bars 56 between the two bars 42 and 44. In one embodiment, the bars 42, 44, and 56 are included as part of the base plate 28 to form the bottom of the chassis 20. In another embodiment, the bars 42, 44, and 56 are components that are separate from the base plate 28.

In the illustrated embodiment, the chassis 20 also includes top plate assemblies, with each top plate assembly including a top plate 46 and two side plates 48. A first top plate assembly includes a first top plate 46 connected or otherwise coupled to the mating plate 22, and also coupled to two side plates 48 positioned perpendicular to the first top plate 46. The top plate 46 and the side plates 48 provide additional support for the mating plate 22 in exemplary embodiments, maintaining the structure of the chassis 20. A second top plate assembly is coupled to the mating plate 24 and includes a second top plate 46 connected or otherwise coupled to the mating plate 24, and also coupled to two side plates 48 positioned perpendicular to the second top plate 46. Similarly, the second top plate 46 and the side plates 48 provide additional support for the mating plate 24 in exemplary embodiments, maintaining the structure of the chassis 20. The top plates 46 are positioned near a raised center portion of the mating plate 22 and the mating plate 24, respectively. The two top plates 46 are substantially identical in size and shape. The top plates 46 include a first flat side for mating with each of the mating plates 22 and 24. The top surface of the top plates 46 is substantially coplanar with the fourth side 148 of the mating plates 22 and 24 when mounted or installed within the chassis 20. The top plates 46 are connected to the side plates 48 at each end of the top plates 46. The top plates 46 are widest at the ends connected to the side plates 48. The top plates 46 include a second side opposite the first flat side and facing the inside of the chassis 20. The second side includes two slanted portions that slope from the ends toward the first flat side to meet at an elongated center section. The four side plates 48 shown are also substantially identical to each other in size and shape. The side plates 48 each include a flat surface for mating with a surface of the mating plate 22 or 24. The side plates 48 are substantially L-shaped, having a flat top portion for mating with the top plate 46 and sloping to an elongated bottom portion for connecting to the bar 42 or 44. The side plates 48 may also be connected to the base plate 28 in exemplary embodiments. In some embodiments, the chassis 20 may include other numbers of top plates 46 and side plates 48 connected or otherwise coupled to one or more components of the chassis 20 in order to maintain the shape and/or integrity of the chassis structure when the chassis 20 is installed within the roof bolter 10 and used to couple drive assemblies to the roof bolter 10. The chassis 20 may also include other plates having other sizes and/or shapes for improving the integrity of the chassis 20 or maintaining its shape and/or functional integrity. The top plates 46 and/or side plates 48 may also include openings or other means of connection for coupling the chassis 20 to the body 16 or one or more other components of the roof bolter 10 in exemplary embodiments.

The chassis 20 may also include attachment brackets 52 and attachment brackets 54 for connecting or otherwise coupling the chassis 20 to one or more components of the roof bolter 10. In the illustrated embodiment, a first attachment bracket 52 and a first attachment bracket 54 are coupled to the mating plate 22 and a second attachment bracket 52 and a second attachment bracket 54 are coupled to the mating plate 24. In an exemplary embodiment, the attachment brackets 52 and 54 are also used to couple the drive assemblies (e.g., crawler assembly 90 or 100, wheel assembly 110 or 130) to the chassis 20. Fasteners or pins may be routed through the brackets 52 and/or 54 in order to couple the appropriate drive assembly to the chassis 20, with the drive assembly having corresponding holes or openings for receiving the fasteners or pins in order to couple the drive assembly to the chassis 20 (and thus the roof bolter 10). The attachment brackets 52 and 54 may also be used to couple the chassis 20 to the roof bolter 10. In the illustrated embodiment, brackets 52 and 54 are included as part of the chassis 20, with one bracket 52 and one bracket 54 coupled to each of the mating plates 22 and 24.

Figure 6:
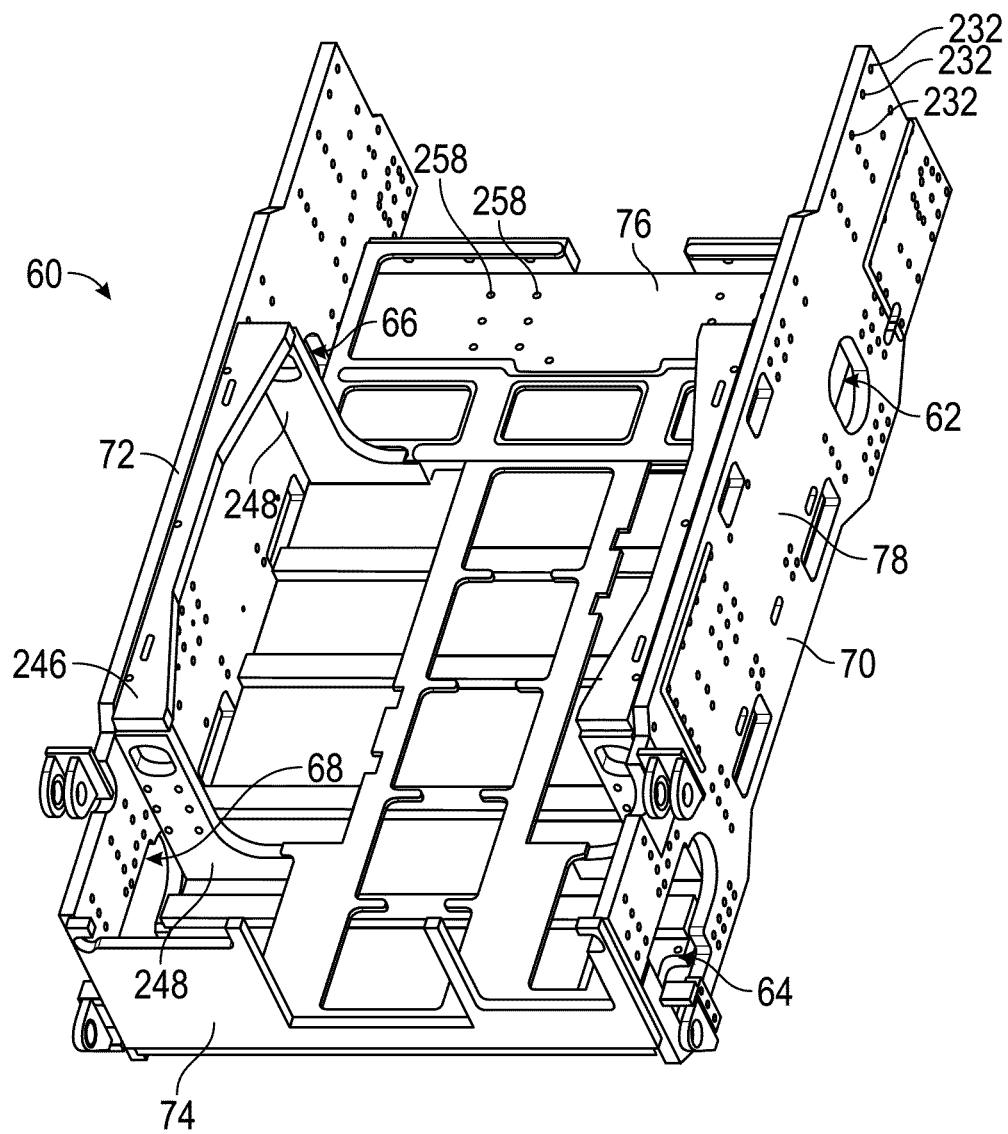
FIG. 6 is a perspective view of another multi-purpose chassis for the roof bolter, according to an exemplary embodiment.
Figure 7:
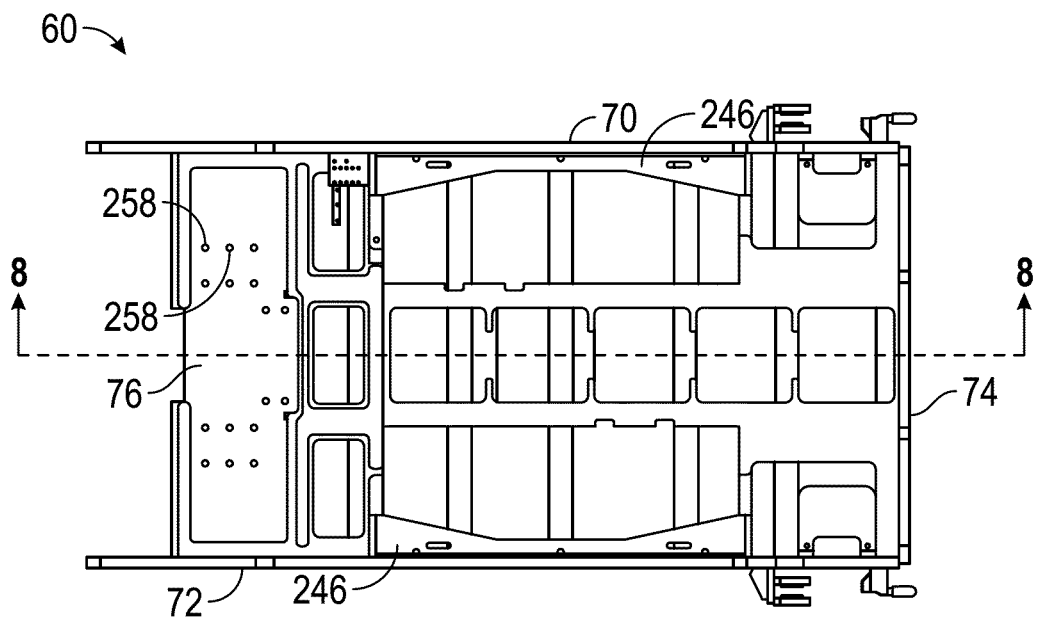
FIG. 7 is a top plan view of the multi-purpose chassis of FIG. 6.
Figure 8:
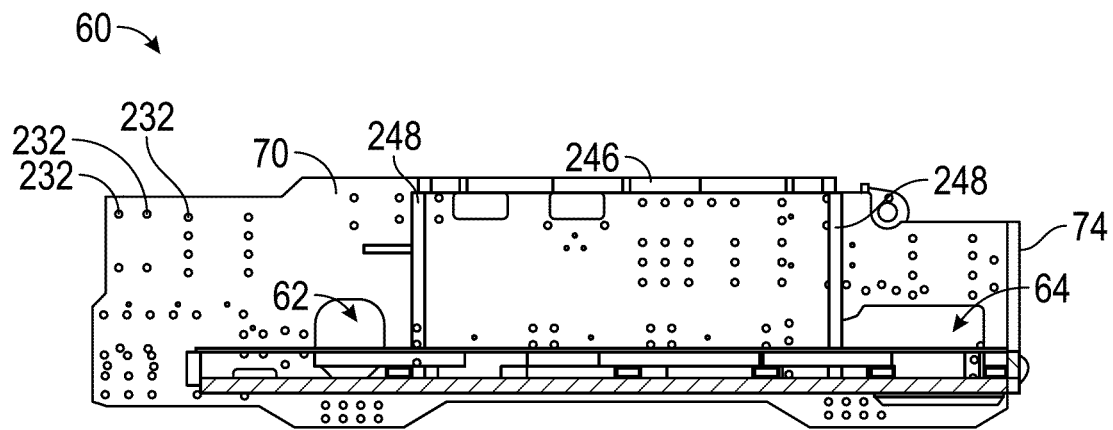
FIG. 8 is a cross-sectional view of the multi-purpose chassis of FIG. 6, taken along line 8-8 in FIG. 7.
Figure 9:
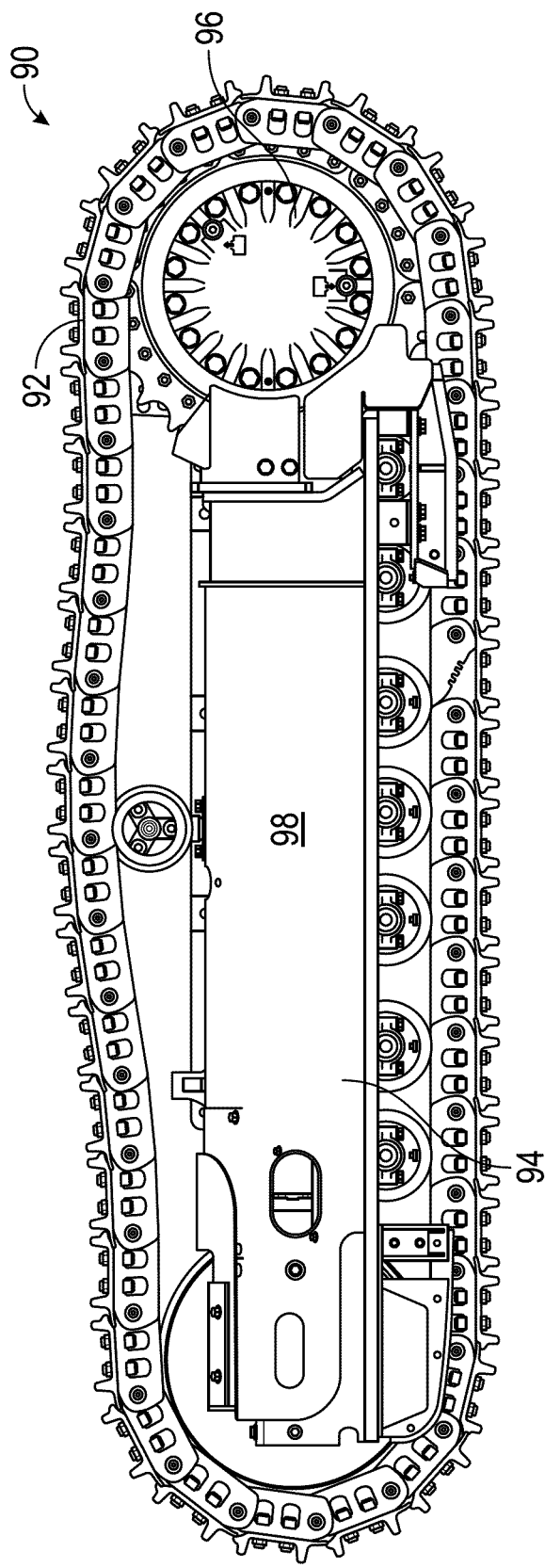
FIG. 9 is a side view of a left hand crawler assembly for the roof bolter, according to an exemplary embodiment.
Figure 10:
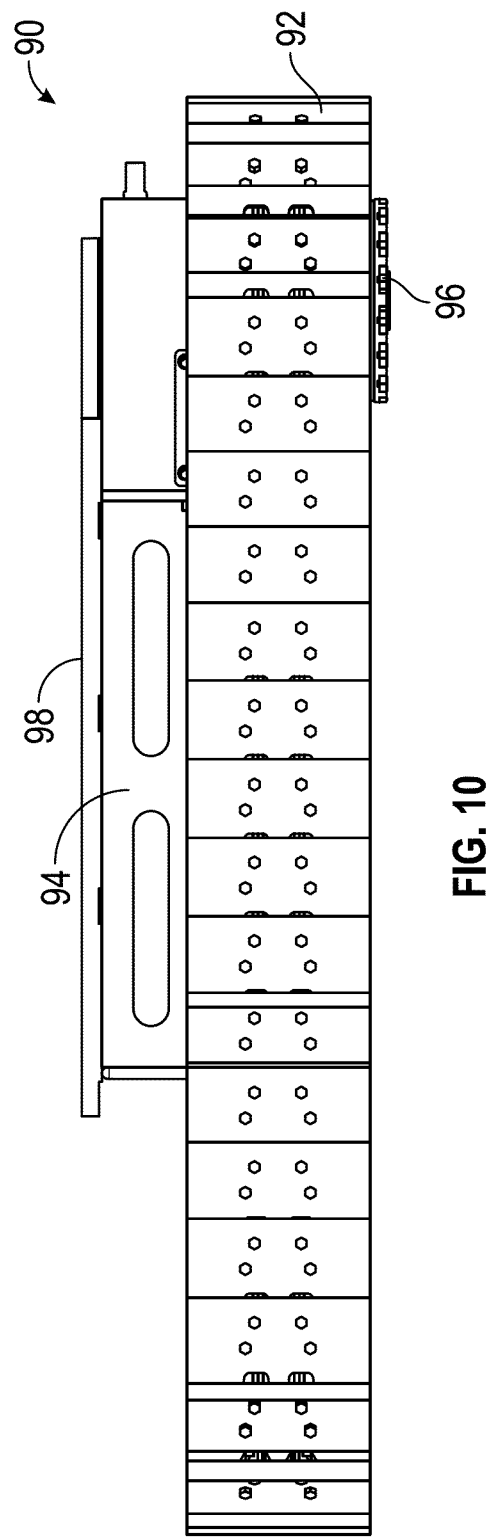
FIG. 10 is a top view of the left hand crawler assembly of FIG. 10.
Figure 12:
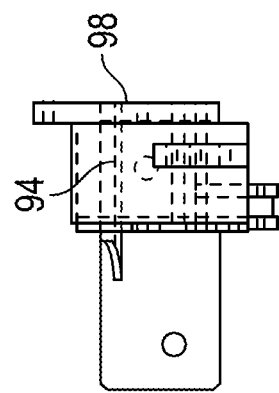
FIG. 12 is a side view of the frame structure of FIG. 11.
Figure 11:
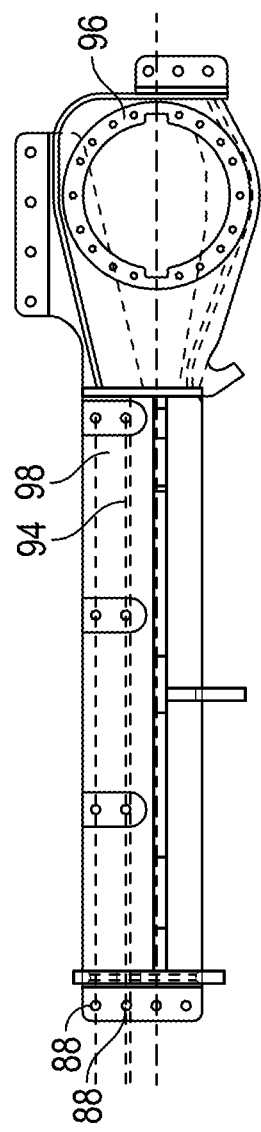
FIG. 11 is a back view of a frame structure for the left hand crawler assembly of FIG. 10, according to an exemplary embodiment.

Referring now to FIGS. 6-8, a chassis 60 is shown according to another exemplary embodiment. The chassis 60 is similar in function and construction to the chassis 20, and thus the above description of the chassis 20 and the components of the chassis 20 apply accordingly to the chassis 60 and the corresponding components of the chassis 60. Like the chassis 20, the chassis 60 may be coupled to the body 16 of the roof bolter 10, providing a framework for the roof bolter 10 and supporting the roof bolter 10 in its construction and use. For instance, the body 16 may be mounted on the chassis 60. In an exemplary embodiment, the chassis 60 is adaptable for the crawler configuration and the wheel configuration of the roof bolter 10, being configured to couple the wheel assemblies 110 and 130 or the crawler assemblies 90 and 100 to the roof bolter 10, depending on which configuration of the roof bolter 10 is necessary or desirable for the particular application of the roof bolter 10.

In the illustrated embodiment of FIGS. 6-8, the chassis 60 includes a first mating plate 72 positioned on a first side of the chassis 60 and a second mating plate 70 positioned on an opposite second side of the chassis 60. The mating plates 70 and 72 are positioned substantially parallel to each other, extending substantially the length of the chassis 60 to form boundaries on opposite sides of the chassis 60. The mating plates 70 and 72 include openings 232 having a function similar to the openings 32 for coupling the wheel assemblies 110 and 130 or the crawler assemblies 90 and 100 to the chassis 20 and thus the roof bolter 10. The openings 232 are patterned differently from the openings 32 of the chassis 20, but the openings 232 are also patterned or configured to match one or more openings of the wheel assemblies 110 and 130 and/or the crawler assemblies 90 and 100. In the illustrated embodiment, the openings 232 include wheel attachment openings and crawler attachment openings.

The chassis 60 also includes a base plate 76 positioned on the bottom of the chassis 60 (according to FIG. 6). The base plate 76 is positioned between and substantially perpendicular to the mating plates 70 and 72. The base plate 76 includes openings 258 which may be used to couple the base plate 76 and the chassis 60 to one or more components of the roof bolter 10. The chassis 60 also includes a back plate 74 positioned between and substantially perpendicular to the mating plates 70 and 72. The back plate 74 extends from the first mating plate 70 to the second mating plate 72, forming another boundary of the chassis 60. The back plate 74 is also substantially perpendicular to the base plate 76, extending vertically from the base plate 76 according to an orientation suitable for installation within the roof bolter 10 (shown in FIGS. 1 and 2 in reference to chassis 20). In an exemplary embodiment, the back plate 74 and the base plate 76 are coupled to the mating plates 70 and 72, and may connect or otherwise couple the mating plate 70 to the mating plate 72. The chassis 60 also includes an open and boundary-less side opposite the back plate 74.

The chassis 60 includes a mating face 78 positioned on the outside of the mating plate 70 and configured to receive a drive assembly (e.g., wheel assembly 110 or 120, crawler assembly 100, etc.). The mating face 78 is substantially flat in exemplary embodiments and configured to abut with a mating face of the drive assembly. The mating plate 72 includes a similar mating face in this embodiment. The chassis 60 also includes axle openings 62 and 66 for receiving a first wheel axle (e.g., a front wheel axle), and axle openings 64 and 68 for receiving a second wheel axle (e.g., a rear wheel axle) in the wheel configuration of the roof bolter 10. The axle openings 62 and 64 are formed in the mating plate 70 and the axle openings 66 and 68 are formed in the mating plate 72. In an exemplary embodiment, the axle openings 62 and 66 are sized and shaped to receive a front wheel axle for connecting two front wheel assemblies (e.g., wheel assemblies 110). In this embodiment, the axle openings 64 and 68 are sized and shaped to receive a rear wheel axle for connecting two rear wheel assemblies (e.g., wheel assemblies 130). The mating plates 70 and 72 include projections or raised portions at each of the axle openings 62, 64, 66, and 68. In exemplary embodiment, these projections or raised portions are intended to accommodate the axle openings 62, 64, 66, and 68, and to provide additional area on the mating faces of the mating plates 70 and 72 (e.g., mating face 78) for receiving a wheel assembly 110 or 130.

In the illustrated embodiment, the chassis 60 also includes top plate assemblies, with each top plate assembly including a top plate 246 and two side plates 248. In an exemplary embodiment, the top plate 246 and the side plates 248 are substantially similar to the top plate 46 and the side plates 48, respectively. A first top plate assembly includes a first top plate 246 connected or otherwise coupled to the mating plate 72, and also coupled to two side plates 248 positioned perpendicular to the first top plate 246. The top plate 246 and the side plates 248 provide additional support for the mating plate 72 in exemplary embodiments, maintaining the structure of the chassis 60. A second top plate 246 is connected or otherwise coupled to the mating plate 70, and also coupled to two side plates 248 positioned perpendicular to the second top plate 246. Similarly, the second top plate 246 and the side plates 248 provide additional support for the mating plate 70 in exemplary embodiments, maintaining the structure of the chassis 60. The top plates 246 are positioned near a raised center portion of the mating plate 70 and the mating plate 72, respectively. The two top plates 246 are substantially identical in size and shape. The top plates 246 include a first flat side for mating with each of the mating plates 70 and 72. The top plates 246 are connected to the side plates 248 at each end of the top plates 246. The top plates 246 are widest at the ends of the top plate 246, angling toward an elongated center section having a smaller width than the two ends. The four side plates 248 shown are also substantially identical to each other in size and shape. The side plates 248 each include a flat surface for mating with a surface of the mating plate 70 or 72. The side plates 248 are substantially L-shaped, having a flat top portion for mating with the top plate 246 and sloping to a substantially perpendicular bottom portion. The top plates 246 and/or side plates 248 may also include openings or other means of connection for coupling the chassis 60 to the body 16 or one or more other components of the roof bolter 10 in exemplary embodiments.

Referring now to FIGS. 9-12, a crawler assembly 90 is shown, according to an exemplary embodiment. The crawler assembly 90 is a left hand crawler drive configured to be coupled to the chassis 20 on the left side of the roof bolter 10 (as shown in FIG. 1). In an exemplary embodiment, the crawler assembly 90 is coupled to the mating plate 22 of the chassis 20. In this embodiment, the crawler assembly 90 includes a frame 94 for supporting the crawler assembly 90 and its components. The crawler assembly 90 also includes tracks 92 that are rotated or driven by a drive 96 to advance the roof bolter 10. The drive 96 and/or the tracks 92 may be coupled to one or more components of the roof bolter 10 in order to control the drive 96, the tracks 92, and/or one or more other components of the crawler assembly 90 to move the tracks 92 and thus move the roof bolter 10. In the illustrated embodiment, the crawler assembly 90 also includes mating surface 98 (e.g., mating plate) for coupling the crawler assembly 90 to the chassis 20. In an exemplary embodiment, fasteners are positioned within or through the openings 88 and crawler attachment openings of the mating plate 22 (e.g., openings 32) to couple or attach the crawler assembly 90 to the chassis 20. In the illustrated embodiment of FIG. 11, the openings 88 are positioned in four vertical columns approximately evenly spaced along the mating surface 98, with a greater number of openings positioned at the end of the mating surface 98 opposite the drive 96. The openings 88 also include a horizontal row above the drive 96 (according to FIG. 11) and another vertical column adjacent the drive 96. In this embodiment, the openings 88 are patterned to match one or more crawler attachment openings of the chassis 20 in order to mate with a mating plate 22 and 24 and couple the crawler assembly 90 to the chassis 20. In other embodiments, the openings 88 may be otherwise patterned or positioned as may be suitable for the particular application of the crawler assembly 90 and/or the chassis 20. In an exemplary embodiment, the crawler assembly 100 includes openings similar to the openings 88 and positioned similarly on the mating surface 102 for coupling the crawler assembly 100 to the chassis 20. The crawler assembly 90 may be removed or de-coupled from the chassis 20 and the roof bolter 10 by removing the fasteners from the openings 88 and the crawler attachment openings. In this way, the crawler assembly 90 may be removed from the roof bolter 10 without removing or replacing the chassis 20.

Figure 13:
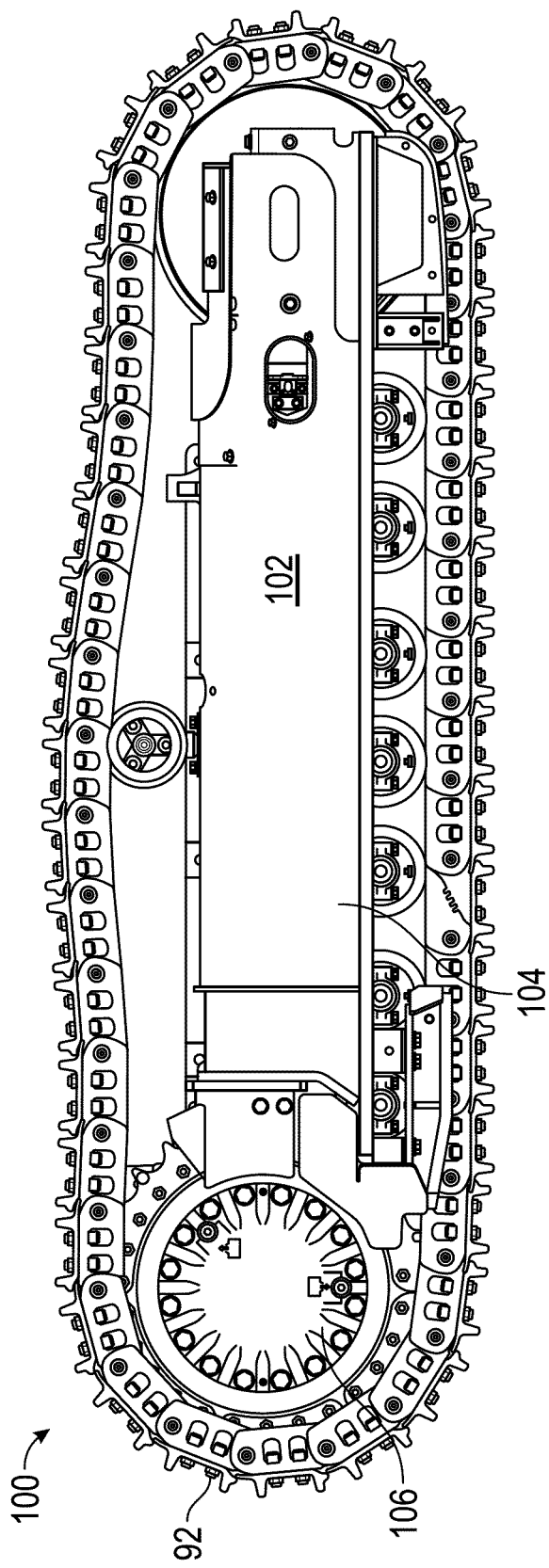
FIG. 13 is a side view of a right hand crawler assembly for the roof bolter, according to an exemplary embodiment.
Figure 14:
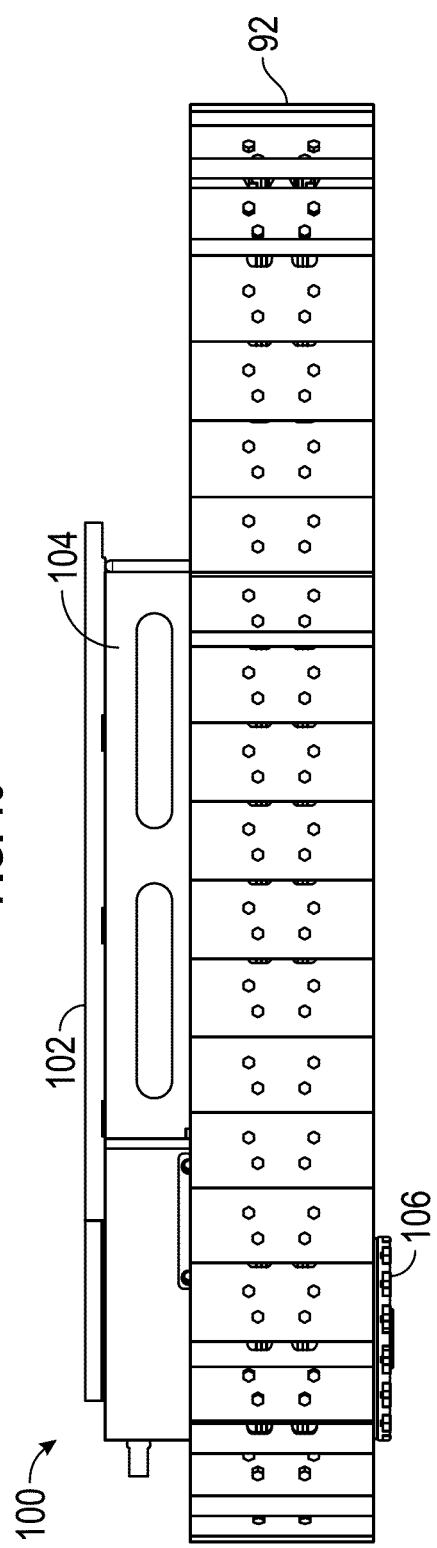
FIG. 14 is a top view of the right hand crawler assembly of FIG. 13.

Referring now to FIGS. 13 and 14, a crawler assembly 100 is shown, according to an exemplary embodiment. The crawler assembly 100 is a right hand crawler drive configured to be coupled to the chassis 20 on the right side of the roof bolter 10 (as shown in FIG. 1). In an exemplary embodiment, the crawler assembly 100 is coupled to the mating plate 24 of the chassis 20. The crawler assembly 100 includes a frame 104 for supporting the crawler assembly 100 and its components. The crawler assembly 100 also includes tracks 92 that are rotated or driven by a drive 106 to advance the roof bolter 10. The drive 106 and/or the tracks 92 may be coupled to one or more components of the roof bolter 10 in order to control the drive 106, the tracks 92, and/or one or more other components of the crawler assembly 100 to move the tracks 92 and thus move the roof bolter 10. In the illustrated embodiment, the crawler assembly 100 also includes a mating surface 102 (e.g., mating plate) for coupling the crawler assembly 100 to the chassis 20. In an exemplary embodiment, fasteners are positioned within or through openings of the mating surface 102 (not shown, but similar to openings 88 of the crawler assembly 90) and crawler attachment openings of the mating plate 24 (e.g., openings 32) to couple or attach the crawler assembly 100 to the chassis 20. In an exemplary embodiment, the openings of the mating surface 102 are patterned substantially similarly to the openings 88 in order to couple the crawler assembly 100 to the chassis 20. The crawler assembly 100 may be removed or de-coupled from the chassis 20 and the roof bolter 10 by removing the fasteners. In this way, the crawler assembly 100 may be removed from the roof bolter 10 without removing or replacing the chassis 20.

Figure 15:
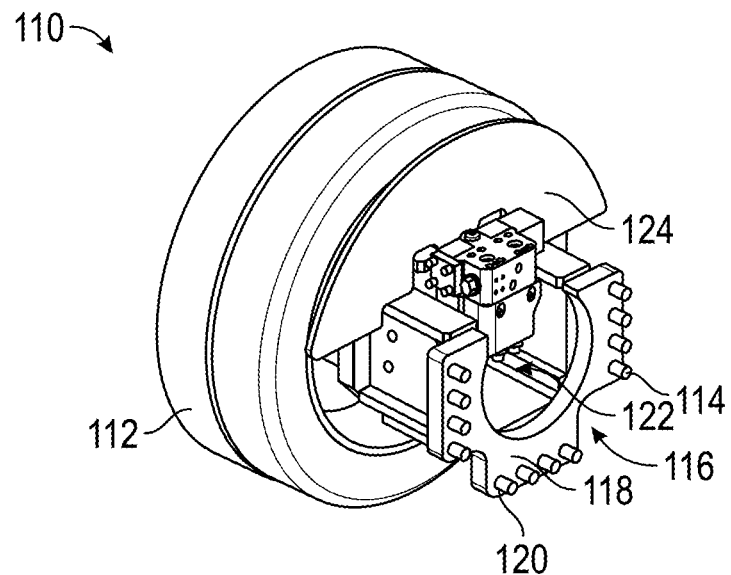
FIG. 15 is a perspective view of a wheel assembly for the roof bolter, according to an exemplary embodiment.
Figure 16:
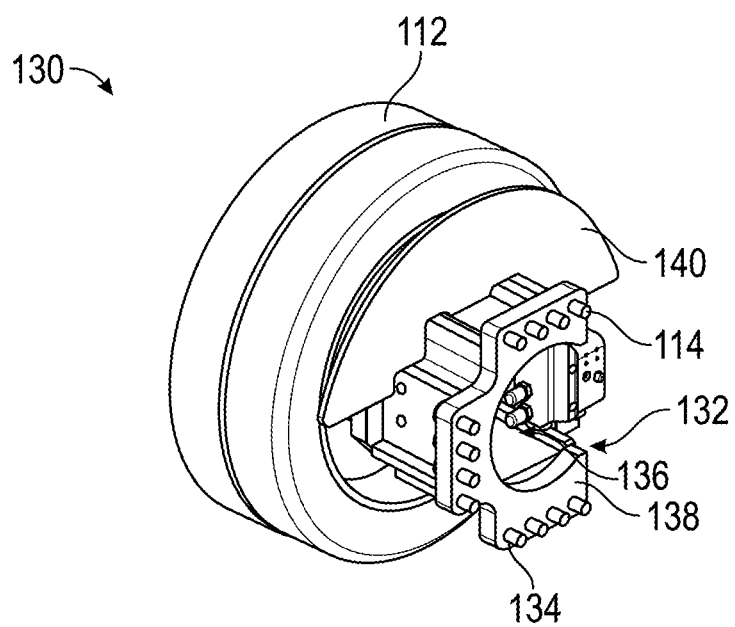
FIG. 16 is a perspective view of another wheel assembly for the roof bolter, according to an exemplary embodiment.

Referring now to FIGS. 15 and 16, the wheel assemblies 110 and 130 are shown, according to an exemplary embodiment. In an exemplary embodiment, the wheel assembly 110 is a front wheel assembly configured to be coupled to a front portion of the roof bolter 10. In an exemplary embodiment, a first wheel assembly 110 is coupled to the chassis 20 at or near the axle opening 34 and a second wheel assembly 110 is coupled to the chassis 20 at or near the axle opening 38. In the illustrated embodiment of FIG. 15, the wheel assembly 110 includes the wheel 112 coupled to a weldment 116. The weldment 116 includes a mating surface 118 having a plurality of openings 120. The mating surface 118 may be substantially flat such that the mating surface 118 abuts with the mating surface of an associated mating plate 22 or 24 (e.g., mating surface 30). In an exemplary embodiment, the openings 120 have a pattern configured to substantially match or line up with at least a portion of the first set of openings around the axle openings 34 and/or 38, such that the wheel assembly 110 may be coupled to the chassis 20 at the axle openings 34 and/or 38. Fasteners 114 may be routed through the openings 120 and the openings 32 of the chassis 20 in order to removably couple the wheel assembly 110 to the chassis 20. In the illustrated embodiment, the weldment 116 also includes an opening 122 for receiving a wheel axle (e.g., a front wheel axle) to connect or couple the wheel assembly 110 to another similar wheel assembly 110 on the opposite side of the chassis 20 (and thus the opposite side of the roof bolter 10).

In an exemplary embodiment, the wheel assembly 130 is a rear wheel assembly configured to be coupled to a rear portion of the roof bolter 10. In an exemplary embodiment, a first wheel assembly 130 is coupled to the chassis 20 at or near the axle opening 36 and a second wheel assembly 130 is coupled to the chassis 20 at or near the axle opening 40. In the illustrated embodiment of FIG. 16, the wheel assembly 130 includes the wheel 112 coupled to a weldment 132. The weldment 132 includes a mating surface 138 having a plurality of openings 134. The mating surface 138 may be substantially flat such that the mating surface 138 abuts with the mating surface of an associated mating plate 22 or 24 (e.g., mating surface 30). In an exemplary embodiment, the openings 134 have a pattern configured to substantially match or line up with at least a portion of the first set of openings around the axle openings 36 and/or 40, such that the wheel assembly 130 may be coupled to the chassis 20 at the axle openings 36 and/or 40. Fasteners 114 may be routed through the openings 134 and the openings 32 of the chassis 20 in order to removably couple the wheel assembly 130 to the chassis 20. In the illustrated embodiment, the weldment 132 also includes an opening 136 for receiving a wheel axle (e.g., a rear wheel axle) to connect or couple the wheel assembly 130 to another similar wheel assembly 130 on the opposite side of the chassis 20 (and thus the opposite side of the roof bolter 10). The wheel assemblies 110 and 130 may be removably coupled to the chassis 20 when the roof bolter 10 is in the wheel configuration, such that the wheel assemblies 110 and 130 may be removed from the roof bolter 10 without removing or replacing the chassis 20 from the roof bolter 10.

In an exemplary embodiment, the roof bolter 10 includes two front wheel assemblies 110 coupled to a front portion of the chassis 20 and two rear wheel assemblies 130 coupled to a rear portion of the chassis 20. In this embodiment, each of the wheel assemblies 110 and 130 includes an individual motor for driving the wheels 112. In an exemplary embodiment, the wheel assemblies 110 and 130 include individual hydraulic brake assemblies for braking each of the wheels 112 separately. In these embodiments, the motors and brake assemblies for the wheel assemblies 110 and 130 are housed within the individual wheel assemblies 110 and 130 and coupled to the roof bolter 10, rather than being housed within the chassis 20.

The construction and arrangement of the multi-purpose machine chassis, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed multi-purpose machine chassis may be implemented into any industrial vehicle having two or more drive configurations, such as a crawler configuration and a wheeled configuration. The disclosed multi-purpose machine chassis is intended to reduce vehicle downtime by reducing the complexity of the changeover process between the two or more drive configurations. The disclosed multi-purpose chassis allows the associated vehicle to be adapted between a first drive configuration and a second drive configuration without removing or replacing the vehicle chassis, reducing the vehicle downtime necessary to change between the two configurations and thus reducing the cost associated with operating the vehicle. The disclosed multi-purpose chassis provides an adaptable chassis or frame for use in a variety of applications and environments.

It will be apparent to those skilled in the art that various modifications and variations can be made to the disclosed multi-purpose machine chassis. Other embodiments will be apparent to those skilled in the art from consideration of the specification and practice of the disclosed multi-purpose machine chassis. It is intended that the specification and examples be considered as exemplary only, with a true scope being indicated by the following claims and their equivalents.

What is claimed is:

1. A chassis for a roof bolter having a wheel configuration and a crawler configuration, the chassis comprising:
    a first plate positioned on a first side of the chassis and having a first mating surface;
    a second plate positioned opposite and substantially parallel to the first plate on a second side of the chassis and having a second mating surface substantially parallel to the first mating surface;
    a first top plate assembly coupled to the first plate for supporting the first plate and a second top plate assembly coupled to the second plate for supporting the second plate, wherein the first and second top plate assemblies each include a top plate coupled to two side plates positioned substantially perpendicular to the top plate; and
    a plurality of openings positioned on the first plate and the second plate for receiving one or more fasteners, the plurality of openings comprising:
        wheel attachment openings patterned to match at least one opening of a wheel assembly for coupling the wheel assembly to at least one of the first plate or the second plate when the roof bolter is in the wheel configuration; and
        crawler attachment openings patterned to match at least one opening of a crawler assembly for coupling the crawler assembly to at least one of the first plate or the second plate when the roof bolter is in the crawler configuration, wherein a pattern of the wheel attachment openings and a pattern of the crawler attachment openings are different.

2. The chassis of claim 1, wherein the first plate comprises a first front axle opening and a first rear axle opening and the second plate comprises a second front axle opening substantially coaxial with the first front axle opening and a second rear axle opening substantially coaxial with the first rear axle opening, and wherein the first and second front axle openings are configured to receive a front axle and the first and second rear axle openings are configured to receive a rear axle when the roof bolter is in the wheel configuration.

3. The chassis of claim 2, wherein at least one of the wheel attachment openings is positioned in an area surrounding the first front axle opening for receiving a first front wheel assembly, the first rear axle opening for receiving a first rear wheel assembly, the second front axle opening for receiving a second front wheel assembly, and the second rear axle opening for receiving a second rear wheel assembly.

4. The chassis of claim 1, wherein the first mating surface and the second mating surface are substantially flat, and wherein the first mating surface is configured to mate with a first crawler assembly when the roof bolter is in the crawler configuration and a first wheel assembly when the roof bolter is in the wheel configuration, and the second mating surface is configured to mate with a second crawler assembly when the roof bolter is in the crawler configuration and a second wheel assembly when the roof bolter is in the wheel configuration.

5. The chassis of claim 1, wherein the first plate substantially mirrors the second plate, and the first and second plates are each substantially rectangular.

6. The chassis of claim 1, further comprising a first attachment bracket coupled to the first plate for coupling the first plate to the roof bolter and a second attachment bracket coupled to the second plate for coupling the second plate to the roof bolter.

7. The chassis of claim 1, wherein at least one of the plurality of openings is included within both the wheel attachment openings and the crawler attachment openings.

8. The chassis of claim 1, wherein the wheel attachment openings are patterned such that the wheel assembly may be coupled to the chassis at more than one height, and the crawler attachment openings are patterned such that the crawler assembly may be coupled to the chassis at more than one height.

9. A roof bolter having a wheel configuration and a crawler configuration, the roof bolter comprising:
 a body comprising a bolting component; and
 a chassis coupled to the body, comprising:
  a first plate positioned on a first side of the chassis and having a first mating surface;
  a second plate positioned opposite and substantially parallel to the first plate on a second side of the chassis and having a second mating surface substantially parallel to the first mating surface; and
  a plurality of openings positioned on the first plate and the second plate for receiving one or more fasteners, the plurality of openings including wheel attachment openings for coupling a wheel assembly to the chassis and crawler attachment openings for coupling a crawler assembly to the chassis, wherein the wheel attachment openings are distinct and separate from the crawler attachment openings.

10. The roof bolter of claim 9, further comprising a first crawler assembly coupled to the first plate and a second crawler assembly coupled to the second plate when the roof bolter is in the crawler configuration.

11. The roof bolter of claim 9, wherein the first plate comprises a first front axle opening and a first rear axle opening and the second plate comprises a second front axle opening substantially coaxial with the first front axle opening and a second rear axle opening substantially coaxial with the first rear axle opening.

12. The roof bolter of claim 11, wherein when the roof bolter is in the wheel configuration the roof bolter further comprises:
 a first front wheel assembly coupled to the first plate;
 a first rear wheel assembly coupled to the first plate;
 a second front wheel assembly coupled to the second plate;
 a second rear wheel assembly coupled to the second plate;
 a front axle positioned within the first and second front axle openings and coupling the first front wheel assembly to the second front wheel assembly; and
 a rear axle positioned within the first and second rear axle openings and coupling the first rear wheel assembly to the second rear wheel assembly.

13. The roof bolter of claim 9, wherein the chassis further comprises a first attachment bracket coupled to the first plate and a second attachment bracket coupled to the second plate, and wherein the first attachment bracket couples the first plate to the roof bolter and the second attachment bracket couples the second plate to the roof bolter.

14. The roof bolter of claim 9, wherein the wheel attachment openings are patterned to substantially match one or more openings of the wheel assembly and the crawler attachment openings are patterned to substantially match one or more openings of the crawler assembly.

15. The roof bolter of claim 9, wherein the wheel attachment openings are patterned such that the wheel assembly may be coupled to the chassis at more than one height, and the crawler attachment openings are patterned such that the crawler assembly may be coupled to the chassis at more than one height.

* * * * *